(12) United States Patent
Choi et al.

(10) Patent No.: US 8,454,184 B2
(45) Date of Patent: Jun. 4, 2013

(54) BACK LIGHTING UNIT HAVING PHOSPHOR FILM STRUCTURE

(75) Inventors: Hyuck Jung Choi, Ansan-si (KR); Sang Min Lee, Ansan-si (KR); Kyung Nam Kim, Ansan-si (KR); Yun Bok Lee, Ansan-si (KR)

(73) Assignee: Seoul Semiconductor Co., Ltd., Seoul (KR)

( * ) Notice: Subject to any disclaimer, the term of this patent is extended or adjusted under 35 U.S.C. 154(b) by 369 days.

(21) Appl. No.: 12/521,489

(22) PCT Filed: Dec. 26, 2007

(86) PCT No.: PCT/KR2007/006815
§ 371 (c)(1),
(2), (4) Date: Jun. 26, 2009

(87) PCT Pub. No.: WO2008/082136
PCT Pub. Date: Jul. 10, 2008

(65) Prior Publication Data
US 2010/0020531 A1  Jan. 28, 2010

(30) Foreign Application Priority Data

Dec. 28, 2006 (KR) .................... 10-2006-0136437
Dec. 21, 2007 (KR) .................... 10-2007-0135784

(51) Int. Cl.
*F21V 9/16* (2006.01)
*G09F 13/20* (2006.01)

(52) U.S. Cl.
USPC ............. 362/97.3; 362/231; 362/84; 362/293

(58) Field of Classification Search
USPC ................ 362/606, 607, 608, 612, 618, 622, 362/627, 230, 231, 235, 249.02, 293, 97.1, 362/97.2, 97.3, 84; 257/88, 89; 313/500, 313/501, 502, 503, 506; 349/106; 345/82, 345/83, 44, 45, 46; 359/885, 887, 890, 891, 359/892
See application file for complete search history.

(56) References Cited

U.S. PATENT DOCUMENTS 6,068,383 A * 5/2000 Robertson et al. ............. 362/84
6,517,213 B1 * 2/2003 Fujita et al. .................... 362/84
(Continued)

FOREIGN PATENT DOCUMENTS

JP 09-73807 3/1997
JP 2003-066872 3/2003
(Continued)

OTHER PUBLICATIONS

Taiwanese Preliminary Notice of the First Office Action dated Jul. 11, 2011, issued for TW Application No. 096150570 corresponding to U.S. Appl. No. 12/521,489.

*Primary Examiner* — Peggy A. Neils
(74) *Attorney, Agent, or Firm* — H.C. Park & Associates, PLC (57) ABSTRACT

A back lighting unit is disclosed in which lower and upper surfaces of a light transmitting plate function as incident and exit surfaces of light, respectively, and a phosphor film structure for wavelength-converting the light is provided at a position which the light is incident on or exits from. The disclosed back lighting unit includes a light emitting means including a light emitting diode disposed to emit light upwards; a light transmitting plate disposed over the light emitting diode, the light transmitting plate having a lower surface allowing light to be incident thereon and an upper surface allowing light to exit therefrom; and a phosphor film structure including a particulate phosphor and formed on at least one of the lower and upper surfaces of the light transmitting plate.

18 Claims, 8 Drawing Sheets

U.S. PATENT DOCUMENTS

| | | | |
|---|---|---|---|
| 7,052,152 B2 * | 5/2006 | Harbers et al. | 362/30 |
| 7,250,715 B2 * | 7/2007 | Mueller et al. | 313/485 |
| 7,513,669 B2 * | 4/2009 | Chua et al. | 362/606 |
| 7,554,129 B2 * | 6/2009 | Roth et al. | 257/100 |
| 7,635,203 B2 * | 12/2009 | Weaver et al. | 362/260 |
| 7,654,681 B2 * | 2/2010 | Kim et al. | 362/97.4 |
| 7,937,865 B2 * | 5/2011 | Li et al. | 40/542 |
| 8,253,326 B2 * | 8/2012 | Maruyama et al. | 313/506 |
| 2004/0008504 A1 * | 1/2004 | Wang et al. | 362/31 |
| 2008/0074583 A1 * | 3/2008 | Li et al. | 349/71 |
| 2009/0086475 A1 * | 4/2009 | Caruso et al. | 362/231 |
| 2009/0129060 A1 * | 5/2009 | Kleppinger | 362/97.2 |
| 2009/0168398 A1 * | 7/2009 | Collier | 362/84 |
| 2010/0205711 A1 * | 8/2010 | Schantz et al. | 2/24 |

FOREIGN PATENT DOCUMENTS

| | | |
|---|---|---|
| JP | 2003-066872 | 5/2003 |
| JP | 10-2005-0022820 | 3/2005 |
| KR | 10-2005-0117165 | 12/2005 |
| KR | 10-2006-0002844 | 1/2006 |
| KR | 20-0410425 | 2/2006 |
| KR | 10-2006-0028932 | 4/2006 |
| KR | 10-0601200 | 7/2006 |
| KR | 10-642786 | 10/2006 |
| TW | 2005-19487 | 6/2005 |
| TW | 2005-41105 | 12/2005 |
| TW | 2006-44023 | 12/2006 |

* cited by examiner

BACK LIGHTING UNIT HAVING PHOSPHOR FILM STRUCTURE

CROSS-REFERENCE TO RELATED APPLICATIONS

This application is the National Stage of International Application No. PCT/KR2007/006815, filed Dec. 26, 2007, and claims priority from and the benefit of Korean Patent Application No. 10-2006-0136437, filed on Dec. 28, 2006, and Korean Patent Application No. 10-2007-0135784, filed on Dec. 21, 2007, which are all hereby incorporated by reference for all purposes as if fully set forth herein.

FIELD OF THE INVENTION

The present invention relates to a back lighting unit, and more particularly, to a back lighting unit having a phosphor film structure formed on a light transmitting plate to convert the wavelength of light.

DISCUSSION OF THE BACKGROUND

Generally, back lighting units, in which a cold cathode fluorescent lamp (CCFL) or a light emitting diode (LED) is used as a light source, have been used to provide light to a liquid crystal display (LCD) or the like. Among such back lighting units, a back lighting unit using a CCFL has disadvantages in that a great quantity of mercury is contained therein not to be environment-friendly and it is difficult to obtain the wavelengths for three uniform primary colors (blue, green and red) due to intrinsic characteristics of the CCFL to depreciate the color reproducibility.

On the contrary, a back lighting unit using a light emitting diode has advantages in that it is environment-friendly and it is easy to implement the wavelengths for three uniform primary colors to have excellent color reproducibility as compared with a CCFL. Furthermore, as high-intensity/high-powered light emitting diodes have been recently developed, the back lighting unit using the light emitting diode has been widely used for illumination of large-sized display devices such as medium to large scaled LCD devices.

Conventionally, methods for mixing primary color lights with each other have been used in the back lighting unit as described above in order to obtain white light for illuminating an object such as an LCD device. These methods are classified into one in which light emitting diode chips for emitting three primary color lights are used and the three primary color lights emitted from the chips are mixed to obtain white light and the other in which a light directly emitted from a light emitting diode chip and lights excited to have different colors by phosphors are mixed with each other. At this time, the phosphors in the latter method are generally contained in a molding member for enclosing the perimeter of the light emitting diode chip. However, the aforementioned back lighting unit has problems in that the space required for the color mixing is short, and both a diffusing sheet itself for diffusing the light and a precise design for the diffusing sheet are essentially required.

SUMMARY OF THE INVENTION

To do this, prior art has been disclosed in which a light emitting diode is installed adjacent to a side surface of a light guide plate and a phosphor film is interposed between the side surface of the light guide plate and the light emitting diode, which is disclosed in Japan Patent Laid-open Publication No. (Hei) 09-73807. However, the aforementioned prior art has problems in that the light emitting diode provides only a small quantity of light through the narrow side surface of the light guide plate, and more specifically, in that the size of the phosphor film is limited due to the area of the side surface of the light guide plate whereby a sufficient amount of the phosphors cannot be provided.

Accordingly, an object of the present invention is to provide a back lighting unit, wherein lower and upper surfaces of a light transmitting plate function as incident and exit surfaces of light, respectively, and a phosphor film structure for wavelength-converting the light is provided at a position which the light is incident on or exits from.

According to an aspect of the present invention, there is provided a back lighting unit, which comprises: a light emitting means including a light emitting diode disposed to emit light upwards; a light transmitting plate disposed over the light emitting diode, the light transmitting plate having a lower surface allowing light to be incident thereon and an upper surface allowing light to exit therefrom; and a phosphor film structure including a particulate phosphor and formed on at least one of the lower and upper surfaces of the light transmitting plate.

Preferably, the light emitting means includes a reflecting portion disposed under the light emitting diode and reflecting light upwards.

Preferably, the phosphor film structure has two or more different color phosphor films arranged one above the other. More preferably, the light emitting diode is a blue light emitting diode, and the phosphor film structure include a green phosphor film and a red phosphor film attached to a lower surface of the green phosphor film. At this time, the red phosphor film may be formed with at least one opening allowing a portion of the green phosphor film to directly face the light emitting diode.

Preferably, the phosphor film structure includes a plurality of dot-shaped phosphor films or a plurality of stripe-shaped phosphor films. The phosphor films may be formed by a thermal printing method.

Preferably, the phosphor film structure includes a plurality of dot-shaped phosphor films, the light emitting means includes a plurality of light emitting diodes, and the plurality of dot-shaped phosphor films are disposed corresponding to the plurality of light emitting diodes. More preferably, the plurality of dot-shaped phosphor films are arranged at a predetermined interval on the upper surface of the light transmitting plate, and the plurality of dot-shaped phosphor films are disposed just above the plurality of light emitting diodes, respectively.

Preferably, the light emitting means includes a blue light emitting diode and a red light emitting diode, and the phosphor film structure includes a green phosphor film.

In the meantime, preferably, the phosphor film structure at least includes a silicate based phosphor having a chemical formula expressed as flows:

$$a(M^IO).b(M^{II}O).c(M^{III}X).d(M^{III}_2O).e(M^{IV}_2O_3).\\f(M^V_oO_p).g(SiO_2).h(M^{VI}_xO_y)$$

wherein $M^I$ is at least one element selected from the group consisting of Pb and Cu; $M^{II}$ is at least one element selected from the group consisting of Be, Mg, Ca, Sr, Ba, Zn, Cd and Mn; $M^{III}$ is at least one element selected from the group consisting of Li, Na, K, Rb, Cs, Au and Ag; $M^{IV}$ is at least one element selected from the group consisting of B, Al, Ga and In; $M^V$ is at least one element selected from the group consisting of Ge, V, Nb, Ta, W, Mo, Ti, Zr and Hf, $M^{VI}$ is at least one element selected from the group consisting of Bi, Sn, Sb, Sc, Y, La, Ce, Pr, Nd, Pm, Sm, Eu, Gd, Tb, Dy, Ho, Er, Tm, Yb and Lu; X is at least one element selected from the group consisting of F, Cl, Br and I; and 0<a≦2, 0<b≦8, 0≦c≦4, 0≦d≦2, 0≦e≦2, 0≦f≦2, 0≦g≦10, 0<h≦5, 1≦o≦2, 1≦p≦5, 1≦x≦2, 및 1≦y≦5.

According to embodiments of the present invention so constructed, a large-sized display panel (specifically, LCD panel) can be provided with an illumination source having uniform brightness. Further, since a phosphor may serve to diffuse the light, the number of the light emitting diodes and the power consumption can be reduced in a back lighting unit in which a plurality of light emitting diodes are disposed under the light transmitting plate.

DETAILED DESCRIPTION OF THE ILLUSTRATED EMBODIMENTS

Hereinafter, preferred embodiments of the present invention will be described in detail with reference to the accompanying drawings. The following embodiments are provided only for illustrative purposes so that those skilled in the art can fully understand the spirit of the present invention. Therefore, the present invention is not limited to the following embodiments but may be implemented in other forms. In the drawings, the widths, lengths, thicknesses and the like of elements may be exaggerated for convenience of illustration. Like reference numerals indicate like elements throughout the specification and drawings.

Figure 1:
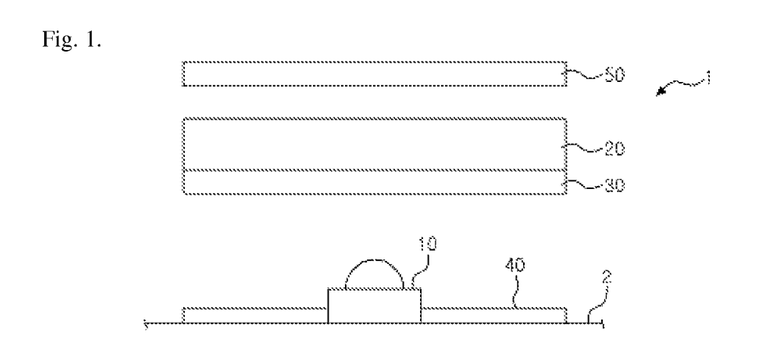
FIG. 1 is a conceptual view showing a back lighting unit according to one embodiment of the present invention.

FIG. 1 is a conceptual view showing a back lighting unit according to one embodiment of the present invention.

As shown in FIG. 1, a back lighting unit 1 according to the present invention includes a light emitting means having a light emitting diode 10, a light transmitting plate 20, and a phosphor film structure 30. In addition, a reflecting portion 40 for reflecting light upwards may be disposed under the light emitting diode 10; and a prism sheet 50 for generating a parallel light may be disposed over the light transmitting plate 20. At this time, the reflecting portion 40 may be a reflecting film attached onto a PCB 2 on which the light emitting diode 10 is mounted.

The light emitting diode 10 is disposed under the light transmitting plate 20 in order for the light emitted from the light emitting diode 10 itself to be directed upward to the light transmitting plate 20. Accordingly, a lower surface of the light transmitting plate 20 functions as an incident surface of light while an upper surface thereof functions as an exit surface of light. In this embodiment, the phosphor film structure 30 is formed on the lower surface of the light transmitting plate 20, so that the phosphor film structure 30 may cause the wavelength of a portion of the light emitted from the light emitting diode 10 to be converted into different wavelength at a position where the light is incident on the light transmitting plate 20. As a result, the portion of the light whose wavelength is converted and the other portion of the light whose wavelength is not converted are allowed to be mixed in the light transmitting plate 20, and further, over the light transmitting plate 20. At this time, if the mixing process of light is sufficiently performed in the light transmitting plate 20, for example, by enlarging the thickness of the light transmitting plate 20, the light transmitting plate 20 may function as a light guide plate used to obtain a surface light source.

At this time, the phosphor film structure 30 consists of at least one phosphor film which includes a particulate phosphor, so that the particulate phosphor may serve to diffuse the light. In addition, the aforementioned position of the phosphor film structure 30 may cause a portion of the light whose wavelength is converted into different color wavelength and the other portion of the light whose wavelength is not converted to be sufficiently mixed in the light transmitting plate 20, and then, the mixed light proceeds.

In the back lighting unit 1 of this embodiment, the blue light emitting diode 10 and the phosphor film structure 30, which includes either green and red phosphors or a yellow phosphor, may be used to implement a white light source. Alternatively, red and blue light emitting diodes 10 and 10 and the phosphor film structure 30 including a green phosphor may be used to implement a white light source. At this time, the phosphor according to this embodiment may not be limited to specific series or kind of phosphor, but it is preferable that green to orange silicate phosphors, green to yellow thiogallate phosphors or red sulfide phosphors be used, which are disclosed in Korean Patent Laid-open Publication Nos. 10-2005-117165, 10-2006-2844 and 10-2006-28932 and Korean Patent Nos. 10-601200 and 10-642786, which are all hereby incorporated by reference for all purposes as if fully set forth herein.

Further, in the back lighting unit 1 according to this embodiment, since the reflecting film or the reflecting pattern may be eliminated from the lower surface of the light transmitting plate 20, the phosphor film structure 30 may be formed onto the entire lower surface of the light transmitting plate 20.

Figure 2:
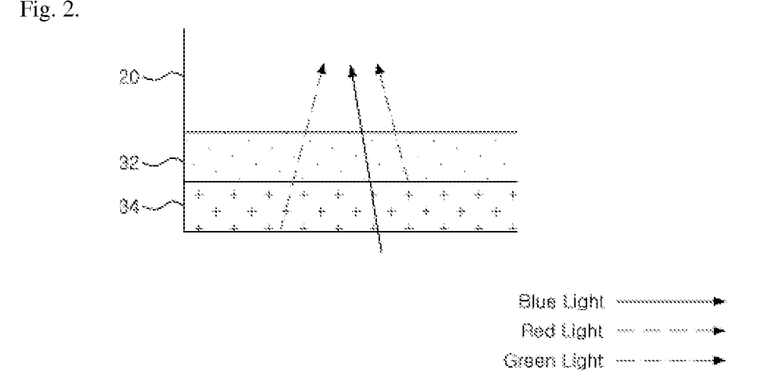
FIG. 2 is a view showing a light transmitting plate and a phosphor film structure of the back lighting unit according to an embodiment of the present invention.

FIG. 2 is a view showing the phosphor film structure 30 according to an embodiment of the present invention. Referring to FIG. 2, the phosphor film structure 30 includes a first phosphor film 32 for emitting green color, which is directly attached to the lower surface of the light transmitting plate 20, and a second phosphor film 34 for emitting red color, which is attached to a lower surface of the first phosphor film 32. The first phosphor film 32 includes, e.g., a silicate or thiogallate based particulate phosphor, while the second phosphor film 34 includes, e.g., a sulfide based particulate phosphor. Further, a method for screen-printing the phosphor onto a transparent membrane (i.e., film) may be used to form the phosphor films 32 and 34 as described above. At this time, the light which proceeds from the light emitting diode toward the phosphor film structure 30 is blue.

According to the aforementioned arrangement, the blue light which is emitted from the light emitting diode and then is incident into the light transmitting plate 20 without colliding with the first phosphor film 32 and the second phosphor film 34, the red light whose wavelength is converted by the red phosphor of the second phosphor film 34 and then is incident into the light transmitting plate 20, and the green light whose wavelength is converted by the green phosphor of the first phosphor film 32 and then is incident into the light transmitting plate 20 are mixed in the light transmitting plate 20 and above the light transmitting plate 20. Specifically, such a color mixing process of light may be mainly performed inside the light transmitting plate 20. This is because the phosphors in the respective first phosphor film 32 and second phosphor film 34 cause the light to be scattered or diffused.

Further, the first phosphor film 32 including the green phosphor is disposed over the second phosphor film 34 including the red phosphor, so that the green light having a higher energy level can be prevented from being absorbed into the red light having a lower energy level, and the loss due to the aforementioned absorption can be prevented from occurring.

Figure 3:
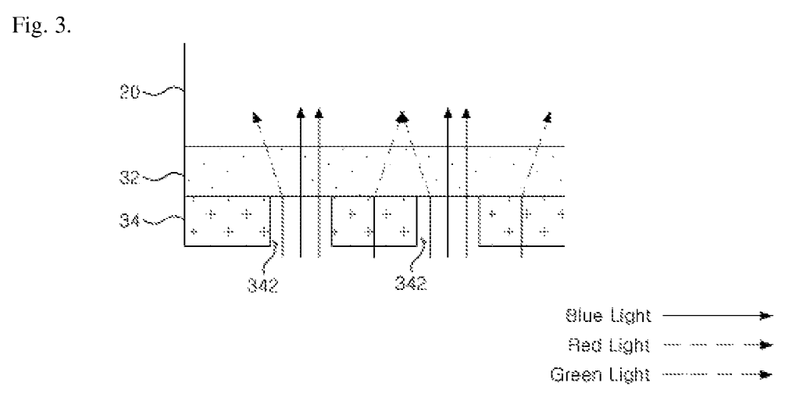
FIG. 3 is a view illustrating a phosphor film structure of a back lighting unit according to another embodiment of the present invention.

FIG. 3 is a view illustrating a phosphor film structure according to another embodiment of the present invention. Referring to FIG. 3, a phosphor film structure of this embodiment is configured to have first and the second phosphor films 32 and 34, which are respectively composed of the same kinds of materials as described in the previous embodiment and arranged one above the other to have the same positions as described in the previous embodiment.

The phosphor film structure of this embodiment may further include at least one opening 342 formed in the second phosphor film 34 so that a portion of the first phosphor film 32 may directly face the light emitting diode 10 (see FIG. 1). Such an opening 342 serves to increase the amount of the blue light which is emitted from the light emitting diode and proceeds toward the first phosphor film 32 or the light transmitting plate 20 installed thereon without passing through the second red phosphor film 34. Accordingly, the amount of the blue light, which has been directly color-converted (i.e., wavelength-converted) into the green light by the phosphor of the first phosphor film 32, is increased. Thus, it is possible to reduce the loss of light caused by the process in which the red light, which has been color-converted from the blue light, is color-converted into the green light again.

Figure 4:
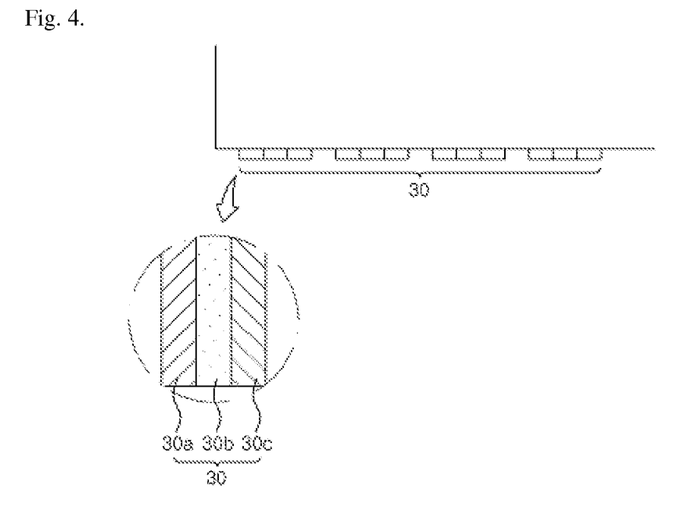
FIG. 4 and FIG. 5 are views illustrating phosphor film structures according to further embodiments of the present invention, respectively.
Figure 5:
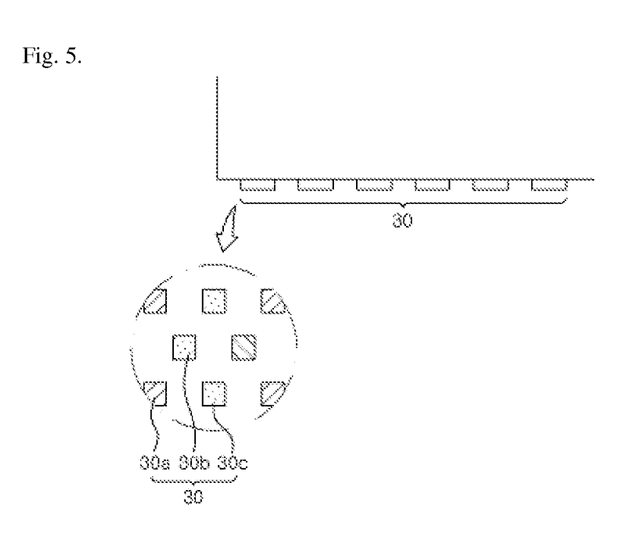

FIG. 4 and FIG. 5 are views illustrating phosphor film structures according to further embodiments of the present invention, respectively.

Referring to FIG. 4, a phosphor film structure 30, in which green, red and blue single-layered phosphor films 30a, 30b and 30c are respectively arranged in the form of a stripe, is formed on the lower surface of the light transmitting plate 20. Further, referring to FIG. 5, a phosphor film structure 30 is formed to have green, red and blue single-layered phosphor films 30a, 30b and 30c which are respectively arranged in the form of a dot. At this time, in the phosphor film structures 30 as shown in FIG. 4 and FIG. 5, ultraviolet light is generated using an ultraviolet light emitting diode, and then the generated ultraviolet light is color-converted into green, red and blue lights. Then, the color-converted lights are mixed in the light transmitting plate 20, thereby obtaining white light.

Figure 6:
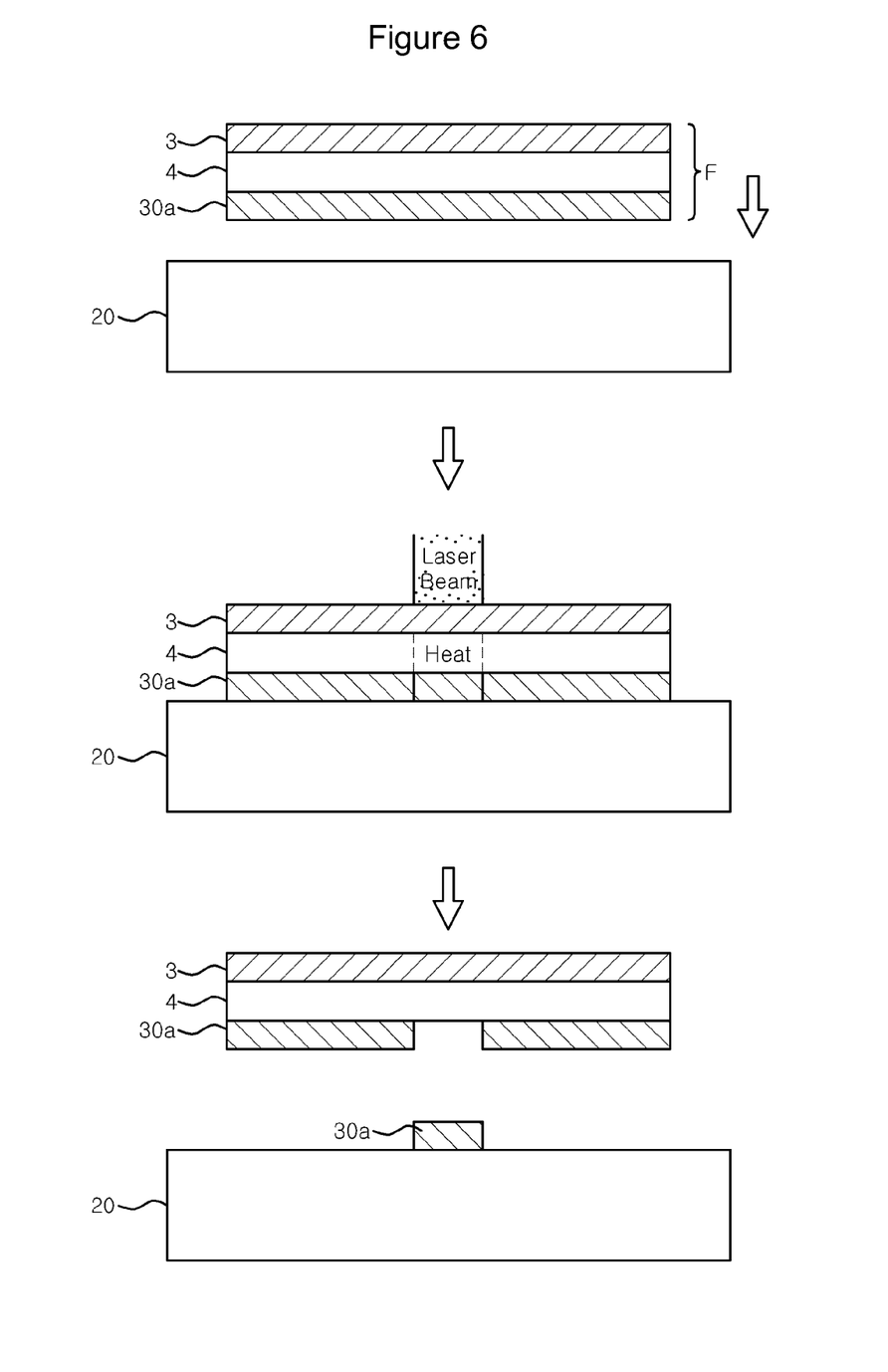
FIG. 6 is a view illustrating a process of forming a phosphor film structure by a thermal printing method.

FIG. 6 is a view illustrating a thermal printing process by which the phosphor film structure 30 as described in the previous embodiments is formed on a surface of the light transmitting plate 20.

Referring to FIG. 6, a thermal printing film F, in which a base film 3, a thermal transition film 4 and the phosphor film 30a are sequentially laminated, is compressed on a surface of the light transmitting plate 20, and then, a portion on the base film 3 is locally irradiated with a laser beam. At this time, the thermal transition film 4 causes the laser beam to be transited into heat. The transited heat causes a portion of the phosphor film 30a to adhere to the light transmitting plate 20. Through this process, the phosphor film structures 30 can be formed on the light transmitting plate 20, as shown in FIG. 4 and FIG. 5.

Figure 7:
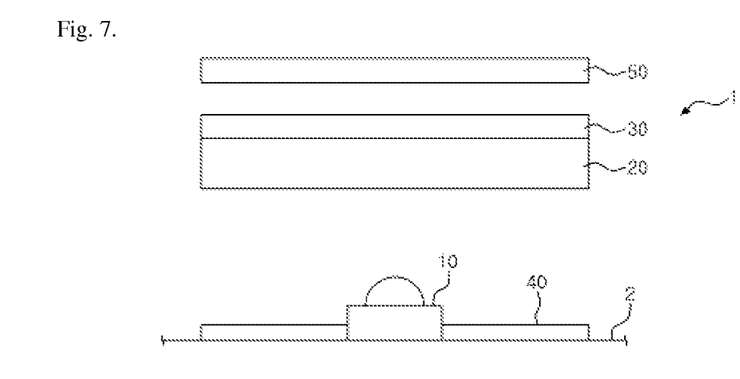
FIG. 7 is a view illustrating a back lighting unit according to a still further embodiment of the present invention.

FIG. 7 is a view illustrating a back lighting unit 1 according to a still further embodiment of the present invention, wherein the phosphor film structure 30 is formed on the upper surface of the light transmitting plate 20. In such a case, since the heat generated from the light emitting diode 10 rarely reaches the phosphor film structure 30, there is an advantage in that it is possible to prevent deterioration of the phosphor film structure 30 caused by the heat generated from the light emitting diode 10.

Figure 8:
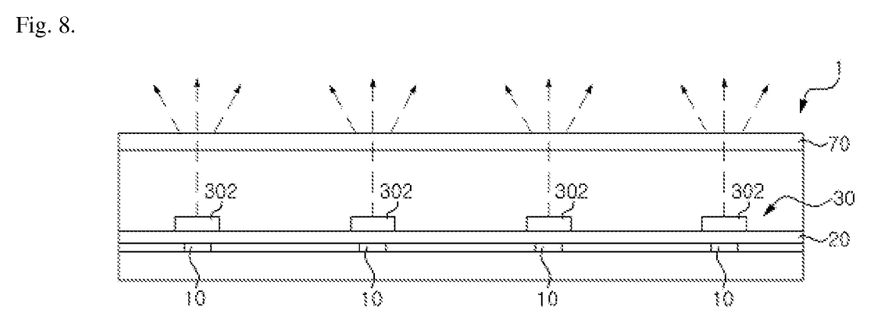
FIG. 8 is a view illustrating a back lighting unit according to a still further embodiment of the present invention.

FIG. 8 is a view illustrating a back lighting unit according to a still further embodiment of the present invention.

Referring to FIG. 8, a back lighting unit 1 of this embodiment includes a plurality of light emitting diodes 10 which are arranged at a predetermined interval, a thin light transmitting plate 20 which is disposed adjacent to the upside of the light emitting diodes 10, a phosphor film structure 30 formed on an upper surface of the light transmitting plate 20, and a diffusing plate 70 upwardly spaced apart from the light transmitting plate 20 on which the phosphor film structure 30 is formed.

The phosphor film structure 30 includes a plurality of dot-shaped phosphor films 302 which are formed on the upper surface of the light transmitting plate 20 and arranged at a predetermined interval. At this time, it is preferable that the dot-shaped phosphor films 302 be formed by the thermal printing method as described in the preceding embodiment, but an inkjet or screen printing method may also be used. The positions of the dot-shaped phosphor films 302 are determined corresponding to the light emitting diodes 10. More specifically, the dot-shaped phosphor films 302 are disposed just above their corresponding light emitting diodes 10, respectively.

According to the back lighting unit 1 of this embodiment, the respective dot-shaped phosphor films 302 and the respective light emitting diodes 10 are arranged corresponding in position to each other, whereby the use of the phosphor can be decreased to contribute to the cost reduction and the increase of the color uniformity of the light. This color uniformity can be implemented by increasing the concentration of the phosphors onto the positions adjacent to the light emitting diode and the optical paths from the light emitting diode.

The invention claimed is:

1. A back lighting unit, comprising:
a light emitter comprising a light emitting diode;
a light transmitting plate disposed over the light emitting diode, the light transmitting plate having a first surface facing the light emitting diode and a second surface opposite the first surface; and
a phosphor film structure comprising a particulate phosphor,
wherein the phosphor film structure is disposed on at least one of the first surface and the second surface of the light transmitting plate,
wherein the phosphor film structure comprises at least two different color phosphor films disposed one above the other,
wherein the light emitting diode is a blue light emitting diode, and the phosphor film structure comprises a green phosphor film and a red phosphor film,
wherein the red phosphor film is disposed between the blue light emitting diode and the green phosphor film, and
wherein the red phosphor film comprises at least one opening that exposes at least a portion of the green phosphor film to the blue light emitting diode.

2. The back lighting unit of claim 1, wherein the light emitter further comprises a reflecting portion disposed under the light emitting diode.

3. The back lighting unit of claim 1, wherein the light emitter further comprises a red light emitting diode.

4. The back lighting unit of claim 1, wherein the phosphor film structure further comprises a silicate based phosphor having a chemical formula expressed as flows:

$$a(M^I O).b(M^{II}O).c(M^{III}X).d(M^{III}_2 O).e(M^{IV}_2 O_3).f(M^V_o O_p).g(SiO_2).h(M^{VI}_x O_y)$$

wherein $M^I$ is at least one element selected from the group consisting of Pb and Cu; $M^{II}$ is at least one element selected from the group consisting of Be, Mg, Ca, Sr, Ba, Zn, Cd and Mn; $M^{III}$ is at least one element selected from the group consisting of Li, Na, K, Rb, Cs, Au and Ag; $M^{IV}$ is at least one element selected from the group consisting of B, Al, Ga and In; $M^V$ is at least one element selected from the group consisting of Ge, V, Nb, Ta, W, Mo, Ti, Zr and Hf; $M^{VI}$ is at least one element selected from the group consisting of Bi, Sn, Sb, Sc, Y, La, Ce, Pr, Nd, Pm, Sm, Eu, Gd, Tb, Dy, Ho, Er, Tm, Yb and Lu; X is at least one element selected from the group consisting of F, Cl, Br and I; and $0<a\leq2$, $0<b\leq8$, $0\leq c\leq4$, $0\leq d\leq2$, $0\leq e\leq2$, $0\leq f\leq2$, $0<g\leq10$, $0<h\leq5$, $1\leq o\leq2$, $1\leq p\leq5$, $1\leq x\leq2$, and $1\leq y\leq5$.

5. A back lighting unit, comprising:
a light emitting diode;
a light transmitting plate disposed over the light emitting diode, the light transmitting plate having a first surface allowing light to be incident thereon and a second surface allowing light to exit therefrom; and
a phosphor film structure disposed on at least one of the first surface and the second surface of the light transmitting plate;
wherein the phosphor film structure comprises at least two color phosphor films disposed one above the other,
wherein the light emitting diode is a blue light emitting diode,
wherein the at least to two color phosphor films comprise a green phosphor film and a red phosphor film,
wherein the red phosphor film is disposed between the light emitting diode and the green phosphor film, and
wherein the red phosphor film comprises at least one opening that exposes at least a portion of the green phosphor film to the light emitting diode.

6. The back lighting unit of claim 5, wherein the phosphor film structure further comprises a silicate based phosphor having a chemical formula expressed as flows:

$$a(M^I O).b(M^{II}O).c(M^{III}X).d(M^{III}_2 O).e(M^{IV}_2 O_3).f(M^V_o O_p).g(SiO_2).h(M^{VI}_x O_y)$$

wherein $M^I$ is at least one element selected from the group consisting of Pb and Cu; $M^{II}$ is at least one element selected from the group consisting of Be, Mg, Ca, Sr, Ba, Zn, Cd and Mn; $M^{III}$ is at least one element selected from the group consisting of Li, Na, K, Rb, Cs, Au and Ag; $M^{IV}$ is at least one element selected from the group consisting of B, Al, Ga and In; $M^V$ is at least one element selected from the group consisting of Ge, V, Nb, Ta, W, Mo, Ti, Zr and Hf; $M^{VI}$ is at least one element selected from the group consisting of Bi, Sn, Sb, Sc, Y, La, Ce, Pr, Nd, Pm, Sm, Eu, Gd, Tb, Dy, Ho, Er, Tm, Yb and Lu; X is at least one element selected from the group consisting of F, Cl, Br and I; and $0<a\leq2$, $0b\leq8$, $0\leq c\leq4$, $0\leq d\leq2$, $0\leq e\leq2$, $0\leq f\leq2$, $0<g\leq10$, $0<h\leq5$, $1\leq o\leq2$, $1\leq p\leq5$, $1\leq x\leq2$, and $1\leq y\leq5$.

7. A back lighting unit, comprising:
a light emitter comprising a light emitting diode;
a light transmitting plate disposed over the light emitting diode, the light transmitting plate having a first surface facing the light emitting diode and a second surface opposite the first surface; and
a plurality of phosphor layers comprising particulate phosphors of one or more colors,
wherein the plurality of phosphor layers are disposed on the light transmitting plate,
wherein at least one of the plurality of phosphor layers is disposed directly on at least another one of the plurality of phosphor layers, and
wherein the at least one of the plurality of phosphor layers is patterned comprising a plurality of voids between patterns of the at least one of the plurality of phosphor layers.

8. The back lighting unit of claim 7, wherein the light emitter further comprises a reflecting portion disposed under the light emitting diode.

9. The back lighting unit of claim 7, wherein the at least one of the plurality of phosphor layers is disposed on either the first surface or the second surface of the light transmitting plate.

10. The back lighting unit of claim 7, wherein the patterns associated with the at least one of the plurality of phosphor layers correspond to stripe-shaped or dot-shaped patterns.

11. The back lighting unit of claim 7, wherein the patterns are arranged at a predetermined interval.

12. The back lighting unit of claim 7, wherein at least one of the patterns comprises red particulate phosphors.

13. The back lighting unit of claim 7, wherein the at least another one of the plurality of phosphor layers comprises green particulate phosphors, green to orange particulate phosphors, or green to yellow particulate phosphors.

14. The backlighting unit of claim 7, wherein the light emitting diode comprises a blue light emitting diode, and wherein the at least one of the plurality of phosphor layers is disposed between the blue light emitting diode and the at least another one of the plurality of phosphor layers.

15. The backlighting unit of claim 7, wherein the particulate phosphors comprise green and red particulate phosphors.

16. The backlighting unit of claim 7, wherein the particulate phosphors include at least one of green to orange phosphors, green to yellow phosphors, and red phosphors.

17. The back lighting unit of claim 7, wherein the at least another one of the plurality of phosphor layers is patterned.

18. The back lighting unit of claim 7, wherein the particulate phosphors comprise at least one silicate based phosphor having a chemical formula expressed as flows:

$$a(M^I O).b(M^{II}O).c(M^{III}X).d(M^{III}_2 O).e(M^{IV}_2 O_3).f(M^V_o O_p).g(SiO_2).h(M^{VI}_x O_y)$$

wherein $M^I$ is at least one element selected from the group consisting of Pb and Cu; $M^{II}$ is at least one element selected from the group consisting of Be, Mg, Ca, Sr, Ba, Zn, Cd and Mn; $M^{III}$ is at least one element selected from the group consisting of Li, Na, K, Rb, Cs, Au and Ag; $M^{IV}$ is at least one element selected from the group consisting of B, Al, Ga and In; $M^V$ is at M"1 least one element selected from the group consisting of Ge, V, Nb, Ta, W, Mo, Ti, Zr and Hf; $M^{VI}$ is at least one element selected from the group consisting of Bi, Sn, Sb, Sc, Y, La, Ce, Pr, Nd, Pm, Sm, Eu, Gd, Tb, Dy, Ho, Er, Tm, Yb and Lu; X is at least one element selected from the group consisting of F, Cl, Br and I; and $0<a\leq2$, $0<b\leq8$, $0\leq c\leq4$, $0\leq d\leq2$, $0\leq e\leq2$, $0\leq f\leq2$, $0<g\leq10$, $0<h\leq5$, $1\leq o\leq2$, $1\leq p5$, $1\leq x\leq2$, and $1\leq y\leq5$.

* * * * *